(12) United States Patent
Pismenny et al.

(10) Patent No.: US 11,765,079 B2
(45) Date of Patent: Sep. 19, 2023

(54) COMPUTATIONAL ACCELERATOR FOR STORAGE OPERATIONS

(71) Applicant: Mellanox Technologies, Ltd., Yokneam (IL)

(72) Inventors: Boris Pismenny, Haifa (IL); Miriam Menes, Tel Aviv (IL); Idan Burstein, Akko (IL); Liran Liss, Misgav (IL); Noam Bloch, Bat Shlomo (IL); Arie Shahar, Jerusalem (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/973,962

(22) Filed: Oct. 26, 2022

(65) Prior Publication Data

US 2023/0046221 A1     Feb. 16, 2023

Related U.S. Application Data

(63) Continuation of application No. 17/108,002, filed on Dec. 1, 2020, now Pat. No. 11,502,948, which is a
(Continued)

(51) Int. Cl.
*H04L 45/00*       (2022.01)
*H04L 45/42*       (2022.01)
(Continued)

(52) U.S. Cl.
CPC ........ *H04L 45/566* (2013.01); *G06F 11/1004* (2013.01); *H04L 45/38* (2013.01);
(Continued)

(58) Field of Classification Search
CPC ....... H04L 45/566; H04L 45/38; H04L 45/42; H04L 69/163; H04L 69/22
See application file for complete search history.

(56) References Cited

U.S. PATENT DOCUMENTS 6,901,496 B1    5/2005   Mukund
7,657,659 B1    2/2010   Lambeth
(Continued)

FOREIGN PATENT DOCUMENTS

| EP | 1657878 A1 | 5/2006 |
|----|------------|--------|
| EP | 2463782 B1 | 8/2017 |
| WO | 2010062679 A3 | 7/2010 |

OTHER PUBLICATIONS

Bohrer et al., U.S. Appl. No. 15/701,459, filed Sep. 12, 2017.
(Continued)

*Primary Examiner* — Natasha W Cosme
(74) *Attorney, Agent, or Firm* — LOWENSTEIN SANDLER LLP (57) ABSTRACT

A method includes detecting, by an accelerator of a networking device, a serial number of a first data packet is out of order with respect to a previous data packet within a first flow of data packets associated with a packet communication network, wherein the serial number is assigned to the first data packet according to a transport protocol. The method includes reconstructing context data associated with the first flow of data packets, wherein the context data comprises encoding information for encoding of data records containing data conveyed in payloads of data packets in the first flow of data packets according to a storage protocol. The method includes using, by the accelerator, the reconstructed context data in processing a data record associated with a second data packet within the first flow, wherein the second data packet is subsequent to the first data packet in the first flow of data packets.

22 Claims, 6 Drawing Sheets

Related U.S. Application Data continuation-in-part of application No. 16/159,767, filed on Oct. 15, 2018, now Pat. No. 11,005,771.

(60) Provisional application No. 62/942,241, filed on Dec. 2, 2019, provisional application No. 62/572,578, filed on Oct. 16, 2017.

(51) Int. Cl.
    *G06F 11/10*     (2006.01)
    *H04L 69/163*     (2022.01)
    *H04L 69/22*     (2022.01)

(52) U.S. Cl.
    CPC ............ *H04L 45/42* (2013.01); *H04L 69/163* (2013.01); *H04L 69/22* (2013.01)

(56) References Cited

U.S. PATENT DOCUMENTS

| | | |
|---|---|---|
| 8,006,297 B2 | 8/2011 | Johnson |
| 8,103,785 B2 | 1/2012 | Crowley |
| 8,824,492 B2 | 9/2014 | Wang |
| 9,038,073 B2 | 5/2015 | Kohlenz |
| 9,678,818 B2 | 6/2017 | Raikin |
| 9,904,568 B2 | 2/2018 | Vincent |
| 10,078,613 B1 | 9/2018 | Ramey |
| 10,120,832 B2 | 11/2018 | Raindel |
| 10,135,739 B2 | 11/2018 | Raindel et al. |
| 10,152,441 B2 | 12/2018 | Liss |
| 10,210,125 B2 | 2/2019 | Burstein |
| 10,218,645 B2 | 2/2019 | Raindel |
| 10,382,350 B2 | 8/2019 | Bohrer |
| 10,423,774 B1 | 9/2019 | Zelenov |
| 10,715,451 B2 | 7/2020 | Raindel et al. |
| 10,824,469 B2 | 11/2020 | Hirshberg et al. |
| 10,841,243 B2 | 11/2020 | Levi et al. |
| 10,956,346 B1 | 3/2021 | Ben-Yehuda et al. |
| 2003/0023846 A1 | 1/2003 | Krishna |
| 2004/0039940 A1 | 2/2004 | Cox |
| 2004/0057434 A1 | 3/2004 | Poon |
| 2004/0062267 A1 | 4/2004 | Minami et al. |
| 2004/0158710 A1 | 8/2004 | Buer |
| 2005/0102497 A1 | 5/2005 | Buer |
| 2005/0198412 A1 | 9/2005 | Pedersen |
| 2006/0095754 A1 | 5/2006 | Hyder |
| 2006/0104308 A1 | 5/2006 | Pinkerton |
| 2008/0147822 A1 | 6/2008 | Benhase |
| 2008/0313364 A1 | 12/2008 | Flynn et al. |
| 2009/0086736 A1 | 4/2009 | Foong |
| 2009/0106771 A1 | 4/2009 | Benner |
| 2009/0319775 A1 | 12/2009 | Buer |
| 2009/0328170 A1 | 12/2009 | Williams |
| 2010/0228962 A1 | 9/2010 | Simon |
| 2011/0119673 A1 | 5/2011 | Bloch et al. |
| 2011/0246597 A1 | 10/2011 | Swanson et al. |
| 2012/0314709 A1 | 12/2012 | Post |
| 2013/0080651 A1 | 3/2013 | Pope |
| 2013/0125125 A1 | 5/2013 | Karino |
| 2013/0142205 A1 | 6/2013 | Munoz |
| 2013/0263247 A1 | 10/2013 | Jungck |
| 2013/0276133 A1 | 10/2013 | Hodges |
| 2013/0329557 A1 | 12/2013 | Petry |
| 2013/0347110 A1 | 12/2013 | Dalal |
| 2014/0129741 A1 | 5/2014 | Shahar |
| 2014/0185616 A1 | 7/2014 | Bloch |
| 2014/0254593 A1 | 9/2014 | Mital |
| 2014/0282050 A1 | 9/2014 | Quinn |
| 2014/0282561 A1 | 9/2014 | Holt |
| 2015/0100962 A1 | 4/2015 | Morita |
| 2015/0288624 A1 | 10/2015 | Raindel |
| 2015/0347185 A1 | 12/2015 | Holt |
| 2015/0355938 A1 | 12/2015 | Jokinen |
| 2016/0065659 A1 | 3/2016 | Bloch et al. |
| 2016/0132329 A1 | 5/2016 | Gupte |
| 2016/0226822 A1 | 8/2016 | Zhang |
| 2016/0306668 A1 | 10/2016 | Heil et al. |
| 2016/0330112 A1 | 11/2016 | Raindel |
| 2016/0330301 A1 | 11/2016 | Raindel |
| 2016/0342547 A1 | 11/2016 | Liss |
| 2016/0350151 A1 | 12/2016 | Zou |
| 2016/0378529 A1 | 12/2016 | Wen |
| 2017/0075855 A1 | 3/2017 | Sajeepa |
| 2017/0180273 A1 | 6/2017 | Daly |
| 2017/0237672 A1 | 8/2017 | Dalal |
| 2017/0264622 A1 | 9/2017 | Cooper |
| 2017/0286157 A1 | 10/2017 | Hasting |
| 2017/0371835 A1 | 12/2017 | Ranadive |
| 2018/0004954 A1 | 1/2018 | Liguori |
| 2018/0067893 A1 | 3/2018 | Raindel |
| 2018/0109471 A1 | 4/2018 | Chang |
| 2018/0114013 A1 | 4/2018 | Sood |
| 2018/0167364 A1 | 6/2018 | Dong |
| 2018/0210751 A1 | 7/2018 | Pepus |
| 2018/0219770 A1 | 8/2018 | Wu |
| 2018/0219772 A1 | 8/2018 | Koster |
| 2018/0246768 A1 | 8/2018 | Palermo |
| 2018/0262468 A1 | 9/2018 | Kumar |
| 2018/0285288 A1 | 10/2018 | Bernat |
| 2018/0329828 A1 | 11/2018 | Apfelbaum |
| 2019/0012350 A1 | 1/2019 | Sindhu |
| 2019/0026157 A1 | 1/2019 | Suzuki |
| 2019/0102568 A1 | 4/2019 | Hausauer et al. |
| 2019/0116127 A1 | 4/2019 | Pismenny |
| 2019/0123891 A1 | 4/2019 | Pismenny et al. |
| 2019/0163364 A1 | 5/2019 | Gibb |
| 2019/0173846 A1 | 6/2019 | Patterson |
| 2019/0190892 A1 | 6/2019 | Menachem et al. |
| 2019/0250938 A1 | 8/2019 | Claes |
| 2020/0012604 A1 | 1/2020 | Agarwal |
| 2020/0026656 A1 | 1/2020 | Liao |
| 2020/0169383 A1 | 5/2020 | Durham et al. |
| 2020/0236140 A1 | 7/2020 | Srinivasan et al. |
| 2020/0314181 A1 | 8/2020 | Menachem et al. |
| 2020/0401440 A1 | 12/2020 | Sankaran |

OTHER PUBLICATIONS

Burstein, "Enabling Remote Persistent Memory", SNIA—PM Summit, pp. 1-24, Jan. 24, 2019.

Chung et al., "Serving DNNs in Real Time at Datacenter Scale with Project Brainwave", IEEE Micro Pre-Print, pp. 1-11, Mar. 22, 2018.

Comer., "Packet Classification: A Faster, More General Alternative to Demultiplexing", The Internet Protocol Journal, vol. 15, No. 4, pp. 12-22, Dec. 2012.

Dierks et al., "The Transport Layer Security (TLS) Protocol Version 1.2", Request for Comments: 5246, pp. 1-104, Aug. 2008.

European Application# 201668019 search report dated May 29, 2020.

European Partial Search Report for European application No. 21189729.3, dated Jan. 3, 2022, 12 pages.

European Extended Search Report for European application No. 21189729.3, dated Jun. 29, 2022, 12 pages.

InfiniBand TM Architecture Specification vol. 1, Release 1.3, pp. 1-1842, Mar. 3, 2015.

Information Sciences Institute, "Transmission Control Protocol; DARPA Internet Program Protocol Specification", Request for Comments 793, pp. 1-90, Sep. 1981.

International Application # PCT/IB2018/058705 search report dated Feb. 18, 2019.

International Application # PCT/IB2018/059824 search report dated Mar. 22, 2019.

Levi et al., U.S. Appl. No. 16/012,826, filed Jun. 20, 2018.

Menachem et al., U.S. Appl. No. 15/841,339, filed Dec. 14, 2017.

Microsoft, "Project Brainwave", pp. 1-5, year 2019.

Netronome Systems, Inc., "Open vSwitch Offload and Acceleration with Agilio® CX SmartNICs", White Paper, pp. 1-7, Mar. 2017.

PCI Express® Base Specification, Revision 3.0, pp. 1-860, Nov. 10, 2010.

Rescorla et al., "The Transport Layer Security (TLS) Protocol Version 1.3", Request for Comments: 8446, pp. 1-160, Aug. 2018.

(56) References Cited

OTHER PUBLICATIONS

Salowey et al., "AES Galois Counter Mode (GCM) Cipher Suites for TLS", Request for Comments: 5288, pp. 1-8, Aug. 2008.
Shirey., "Internet Security Glossary, Version 2", Request for Comments 4949, pp. 1-365, Aug. 2007.
Stevens., "TCP Slow Start, Congestion Avoidance, Fast Retransmit, and Fast Recovery Algorithms", Request for Comments 2001, pp. 1-6, Jan. 1997.
Talpey, "Remote Persistent Memory- With Nothing But Net", SNIA-Storage developer conference, pp. 1-30, year 2017.
Turner et al., "Prohibiting Secure Sockets Layer (SSL) Version 2.0", Request for Comments: 6176, pp. 1-4, Mar. 2011.
U.S. Appl. No. 16/202,132 Office Action dated Apr. 2, 2020.
U.S. Appl. No. 15/701,459 Office Action dated Dec. 27, 2018.
U.S. Appl. No. 16/012,826 Office Action dated Oct. 1, 2019.
U.S. Appl. No. 15/146,013 Office Action dated Dec. 19, 2018.
U.S. Appl. No. 16/827,912 Office Action dated Jan. 1, 2021.
Lebeane et al., "Extended Task queuing: Active Messages for Heterogeneous Systems", Proceedings of the International Conference for High Performance Computing, Networking, Storage and Analysis (SC'16), pp. 933-944, Nov. 2016.
NVM Express Inc., "NVM Express TM Nase Specification", Revision 1.4, p. 1-403, Jun. 10, 2019.
Pismenny et al., "Autonomous NIC Offloads", submitted for evaluation of the 26th International Conference on Architectual Support for Programming Languages and Operating Systems (ASPLOS '21), p. 1-18, Dec. 13, 2020.
U.S. Appl. No. 16/827,912 Office Action dated Jun. 1, 2021.

COMPUTATIONAL ACCELERATOR FOR STORAGE OPERATIONS

CROSS-REFERENCE TO RELATED APPLICATIONS

This application is a continuation of U.S. patent application Ser. No. 17/108,002, filed Dec. 1, 2020, which claims the benefit of U.S. Provisional Patent Application 62/942,241, filed Dec. 2, 2019. U.S. patent application Ser. No. 17/108,002 is continuation-in-part of U.S. patent application Ser. No. 16/159,767, filed Oct. 15, 2018, which claims the benefit of U.S. Provisional Patent Application 62/572,578, filed Oct. 16, 2017. All of these related applications are incorporated herein by reference.

FIELD OF THE INVENTION

The present invention relates generally to computer systems, and particularly to computational accelerator devices and methods.

BACKGROUND

Computational accelerators are commonly used in offloading computation-intensive tasks from the central processing unit (CPU, also referred to as the host processor) of a host computer. Such accelerators typically comprise hardware logic that is dedicated to a particular type of operations, such as cryptography or data compression, and can thus perform these operations much faster than software-driven computation by the CPU. When an accelerator is to be used in processing the payloads of a stream of data packets, however, it may have to implement not only its intended computational function, but also packet header processing and communication protocol logic.

For example, U.S. Patent Application Publication 2016/0330112, whose disclosure is incorporated herein by reference, describes a data processing device that includes a first packet communication interface for communication with at least one host processor via a network interface controller (NIC) and a second packet communication interface for communication with a packet data network. A memory holds a flow state table containing context information with respect to multiple packet flows conveyed between the host processor and the network via the first and second packet communication interfaces. Acceleration logic, coupled between the first and second packet communication interfaces, performs computational operations on payloads of packets in the multiple packet flows using the context information in the flow state table.

NVM Express (NVMe™) is an open logical-device interface specification for accessing non-volatile memory (NVM) attached via PCI Express® (PCIe®) bus. NVMe defines an interface protocol between that enables a host processor to store and access data in NVM with high speed and efficiency over the PCIe bus. The NVM Express organization has more recently defined specifications that enable NVMe devices to be accessed remotely over packet data networks. Among these specifications, NVMe/TCP defines the mapping of NVMe queues, capsules and data delivery over Internet Protocol (IP) networks using the ubiquitous Layer-4 Transmission Control Protocol (TCP). NVMe commands and responses are encapsulated into a message-based system by using "capsules" that contain one or more NVMe commands or responses.

SUMMARY

Embodiments of the present invention that are described herein below provide improved devices and methods for computational acceleration in a computer system.

There is therefore provided, in accordance with an embodiment of the invention, packet processing apparatus, including a first interface configured to be coupled to a host processor and a second interface configured to transmit and receive data packets, including respective headers and payloads, to and from a packet communication network. A memory is configured to hold context information with respect to one or more flows of the data packets conveyed from the host processor to the network via the apparatus in accordance with a reliable transport protocol, which assigns respective serial numbers to the data packets in each of the flows, and with respect to encoding, in accordance with a storage protocol, of data records that are conveyed in the payloads of the data packets in the one or more flows. Processing circuitry is coupled between the first and second interfaces and configured to transmit the data packets through the second interface to the packet communication network in accordance with instructions from the host processor, and includes acceleration logic, which is configured to encode the data records in accordance with the storage protocol using the context information while updating the context information in accordance with the serial numbers and the data records of the transmitted data packets. The acceleration logic is configured, upon receiving an instruction from the host processor to retransmit a data packet, to recover the context information with respect to the data packet, to re-encode a payload of the data packet using the recovered context information, and to retransmit the data packet to the packet communication network.

In some embodiments, at least some of the data records have respective lengths that span multiple consecutive data packets, and the acceleration logic is configured, in response to receiving the instruction, to update the context data and re-encode a part of a data record that is to be retransmitted in the data packet. In a disclosed embodiment, the acceleration logic is configured to recover the context data using metadata concerning the data record that was transmitted in one or more of the data packets in the flow that preceded the data packet that is to be retransmitted.

Additionally or alternatively, the acceleration logic is configured to receive the instruction to retransmit the data packet after having transmitted one or more subsequent data packets in the flow to the network, and to recover a first context for use in re-encoding the payload of the data packet that is to be retransmitted while saving a second context that was updated with respect to the one or more subsequent data packets, and to resume encoding the data records using the second context after retransmission of the data packet.

In a disclosed embodiment, the reliable transport protocol includes a Transmission Control Protocol (TCP).

Additionally or alternatively, encoding the data records includes computing an error-detection code over the data records in accordance with the storage protocol. In one embodiment, the storage protocol includes a Nonvolatile Memory Express (NVMe) protocol, and the error-detection code includes a cyclic redundancy code (CRC).

Further additionally or alternatively, the processing circuitry is further configured to encode the data records in accordance with a session-layer cryptographic protocol.

There is also provided, in accordance with an embodiment of the invention, packet processing apparatus, including a first interface configured to be coupled to a host processor having a host memory and a second interface configured to transmit and receive data packets, including respective packet headers and payloads, to and from a packet communication network. A memory is configured to hold context information with respect to one or more flows of the data packets conveyed from the network to the host processor via the apparatus in accordance with a reliable transport protocol, which assigns respective serial numbers to the data packets in each of the flows, and with respect to encoding, in accordance with a storage protocol, of data records containing data that are conveyed in the payloads of the data packets in the one or more flows. Processing circuitry is coupled between the first and second interfaces and includes acceleration logic, which is configured to process the data records in accordance with the storage protocol using the context information while updating the context information in accordance with the serial numbers and the data records of the received data packets, whereby the processing circuitry extracts and writes the data from the data records through the first interface to the host memory. The acceleration logic is configured, upon receiving, in a given flow, a data packet containing a serial number that is out of order with respect to a previous packet in the given flow, to reconstruct the context information and to apply the reconstructed context information in processing the data records in subsequent data packets in the given flow.

In a disclosed embodiment, the processing circuitry is configured to write the data packets received in the given flow starting from the data packet containing the serial number that is out of order to the host memory without extracting the data from the data records until the acceleration logic has completed reconstructing the context information, wherein the host processor extracts the data from the data records that have not been processed by the acceleration logic.

In some embodiments, the data records include record headers, and the acceleration logic is configured to search the payloads of one or more of the data packets in the given flow beginning with the data packet containing the serial number that is out of order in order to find at least one of the record headers, and to recover the context information using the at least one of the record headers. In one embodiment, at least some of the data records have respective lengths that span multiple consecutive data packets, and the acceleration logic is configured to search for the at least one of the record headers over a sequence of the data packets in the given flow. In a disclosed embodiment, the record headers contain a length field containing a value indicating a length of the records, and the acceleration logic is configured to identify a record header of a first record in one of the packets in the sequence, to read a value of the length field from the identified record header, and to apply the value of the length field in finding and verifying a second record in a subsequent packet in the sequence.

Additionally or alternatively, the data records include record headers, which specify respective buffers in the host memory, and the acceleration logic is configured to parse the record headers so as to identify the respective buffers, whereby the processing circuitry writes the data to the identified buffers. In a disclosed embodiment, the processing circuitry is configured to write the packet headers and the record headers to a receive ring buffer in the host memory, which is separate from the buffers identified by the record headers.

In some embodiments, processing the data records includes computing and verifying an error-detection code over each of the data records in accordance with the storage protocol. In one embodiment, the processing circuitry is configured, upon verifying the error-detection code over a given data record, to indicate to software running on the host processor that further verification of the error-detection code by the host processor is not needed.

In a disclosed embodiment, the reliable transport protocol defines a connection over the packet communication network between the apparatus and a peer computer, wherein the data records conveyed over the connection pertain to multiple storage transactions, each having a different, respective context, and the processing circuitry is configured to identify the respective context of each of the data records and to parse each of the data records using the identified context.

In one embodiment, the processing circuitry is further configured, prior to processing the data records, to decode the data records in accordance with a session-layer cryptographic protocol.

There is additionally provided, in accordance with an embodiment of the invention, a system, including a host processor, which has a host memory and is coupled to store data in a non-volatile memory in accordance with a storage protocol. A network interface controller (NIC) receives data packets conveyed over a packet communication network from peer computers containing, in payloads of the data packets, data records that encode data in accordance with the storage protocol for storage in the non-volatile memory. The NIC processes the data records in the data packets that are received in order in each flow from a peer computer and extracts and writes the data to the host memory, and when a data packet arrives out of order, writes the data packet to the host memory without extracting the data and processes the data packets in the flow so as to recover context information for use in processing the data records in subsequent data packets in the flow.

There is further provided, in accordance with an embodiment of the invention, a method for packet processing, which includes receiving instructions via a first interface from a host processor with respect to data packets, including respective headers and payloads, that are to be transmitted to a packet communication network via a second interface. Context information is stored in a memory with respect to one or more flows of the data packets that are transmitted to the network via the second interface in accordance with a reliable transport protocol, which assigns respective serial numbers to the data packets in each of the flows, and with respect to encoding, in accordance with a storage protocol, of data records that are conveyed in the payloads of the data packets in the one or more flows. In response to the instructions from the host processor, acceleration logic coupled between the first and second interfaces is applied to encode the data records in accordance with the storage protocol using the context information, while updating the context information in accordance with the serial numbers and the data records of the transmitted data packets. The data packets containing the encoded data records are transmitted through the second interface to the packet communication network in accordance with the instructions from the host processor. Upon receiving an instruction from the host processor to retransmit a data packet, the acceleration logic is applied to recover the context information with respect to the data packet, re-encode a payload of the data packet using the recover context information, and retransmit the data packet through the second interface to the packet communication network.

There is moreover provided, in accordance with an embodiment of the invention, a method for packet processing, which includes receiving instructions via a first interface from a host processor, having a host memory, with respect to data packets, including respective headers and payloads, that are received from a packet communication network via a second interface. Context information is stored in a memory with respect to one or more flows of the data packets that are received from the network via the second interface in accordance with a reliable transport protocol, which assigns respective serial numbers to the data packets in each of the flows, and with respect to encoding, in accordance with a storage protocol, of data records containing data that are conveyed in the payloads of the data packets in the one or more flows. In response to the instructions from the host processor, acceleration logic coupled between the first and second interfaces is applied to process the data records in accordance with the storage protocol using the context information, while updating the context information in accordance with the serial numbers and the data records of the received data packets. The data from the data records are extracted and written through the first interface to the host memory. Upon receiving, in a given flow, a data packet containing a serial number that is out of order with respect to a previous packet in the given flow, the acceleration logic is applied to recover the context information and to apply the recovered context information in processing the data records in subsequent data packets in the given flow.

The present invention will be more fully understood from the following detailed description of the embodiments thereof, taken together with the drawings in which:

DETAILED DESCRIPTION

Embodiments of the present invention that are described herein below are directed specifically to computational accelerators for performing network storage protocols, such as the Internet Small Computer Systems Interface (iSCSI), NVMe/TCP, Network File System (NFS) and Network Block Device (NBD) protocols. As noted earlier, computational accelerators for packet processing are often required to implement not only their intended computational functions, but also packet header processing and communication protocol logic. For stateless link-layer and network-layer protocols, such as Ethernet and Internet Protocol (IP), this logical burden is manageable. Connection-oriented transport protocols, such as TCP, however, are much, more complex. Although, hardware implementations of TCP processing functions are known in the art, they are costly in terms of chip "real estate" and limited in the number of flows they can support. As a result of these issues, computational operations involved in session-layer storage solutions, such as iSCSI and NVMe/TCP, are generally performed in software on the host CPU, rather than offloaded to a hardware accelerator.

The accelerator described in the above-mentioned US 2016/0330112 addresses these limitations by holding computational context information in a "flow state table" in local memory, and updating the table as required. The table contains an entry for each flow that the host processor chooses to pass to the accelerator for processing. Each flow corresponds, for example, to a respective TCP connection, and the accelerator handles multiple flows in parallel on the fly. As long as packets are received in order, this accelerator relieves the host entirely of the burden of cryptographic computations, while reverting to host software handling when transport protocol irregularities are encountered. Because of the reliance on host software for handling irregularities, however, the accelerator of US 2016/0330112 imposes a substantial burden on the CPU when packet retransmission is required in a transmitted (Tx) flow or when a packet is lost or arrives out of order in a received (Rx) flow.

Embodiments of the present invention that are described herein address these problems by enabling the accelerator to maintain and recover the flow state and computational context independently of the CPU. For this purpose, the accelerator makes use of protocol information contained in the packet flow itself, including both transport-layer information in the packet headers and session-layer framing information that can be found in the packet payloads. For example, at the transport layer, the accelerator can track and make use of the TCP serial numbers; while at the session layer, the accelerator can detect and use the NVMe headers. These capabilities of the accelerator thus reduce the burden on the CPU, as well as conserving communication bandwidth on the host bus between the accelerator and the CPU.

The present embodiments are directed particularly to computational accelerators for use in encoding payload data in accordance with a session-layer storage protocol, for transmission over a network in packet flows that are transmitted using a reliable transport protocol, as well as in receiving and parsing such payload data. The term "reliable transport protocol" refers to packet communication protocols in Layer 4 of the Open Systems Interconnection (OSI) model, such as TCP, which verify reception of packets and include a mechanism for retransmission of packets that are not received at the intended destination. Such protocols typically assign to the packets respective serial numbers, which are incorporated in the packet headers.

The term "session-layer protocol" is used herein to refer to protocols that run above the transport layer and are used by the transmitting and the receiving computers in establishing the context for a communication session that can extend over multiple packets. In the present case, this context is used by the transmitting computer in framing and encoding data records that are to be conveyed in the payloads of the packets in a reliable transport flow. The term "record" refers to a segment of data of a specified length, with the possible addition of metadata pertaining to the data segment. In the NVMe protocol, for example, these records are referred to as protocol data units (PDUs), which enclose blocks of data between a PDU header and a digest comprising a cyclic redundancy code (CRC) computed over the data. The term "encoding" refers to computational operations that are applied to the data records before transmission by the transmitting computer, using the session-layer context, such as generating the PDU headers and computing the digest in the case of NVMe. Processing of the packets by the accelerator in the receiving computer includes parsing the data stream to identify the PDU fields, checking the CRC, and copying the data into place in the memory. In some embodiments, the accelerator may additionally perform other computations, such as encoding and decoding of the data in accordance with a session-layer cryptographic protocol, such as the Secure Sockets Layer (SSL) and Transport Layer Security (TLS) protocols, as described in the above-mentioned U.S. patent application Ser. No. 16/159,767.

In some session-layer protocols, such as NVMe/TCP, the data records can have respective lengths that are larger than the maximum packet payload size, meaning that at least some of the encoded data records will span multiple consecutive data packets. Thus, in order to encode a given data record, the session context information must be maintained and updated over multiple consecutive data packets in order. As a result, when a packet is to be transmitted out of order (typically in response to a retransmission request) or is received out of order, the context information may be lost. Embodiments of the present invention provide computational accelerators and methods for operation of such accelerators that are capable of recovering the lost context information in such situations.

In the disclosed embodiments, data encoding and decoding computations are offloaded from the host processor to dedicated acceleration logic in packet processing apparatus, such as a NIC. The packet processing apparatus has an interface that is coupled to the host processor and another interface that transmits and receives data packets to and from a packet communication network. Processing circuitry in the apparatus receives and transmits the data packets between the interfaces in accordance with instructions from the host processor.

For purposes of the computational offload, the apparatus includes a memory, which holds context information (as defined above) with respect to flows of the data packets conveyed between the host processor and the network via the apparatus in accordance with a reliable transport protocol, and with respect to encoding, in accordance with a session-layer protocol, of data records that are conveyed in the payloads of the data packets. The acceleration logic encodes or parses the data records in accordance with the session-layer protocol using the context information while updating the context information in accordance with the serial numbers and the data records of the data packets that it processes.

When the context is lost due to an out-of-order packet, in either a transmitted or a received packet flow, the acceleration logic reconstructs or otherwise recovers the context information, on the basis of the out-of-order packet itself and/or other packets in the same flow. In some embodiments, the acceleration logic itself locates and extracts the necessary values from the fields of the packet headers and payloads, and then computes the context information on this basis. Alternatively or additionally, the acceleration logic receives reconstructed context information from software running on the host processor. In some embodiments, the acceleration logic may ask the host processor to verify certain information that it has attempted to reconstruct, as explained below, or to process the payloads of packets that are received while the acceleration logic is in the process of context recovery.

The embodiments described below relate specifically to acceleration of storage operations in accordance with the NVMe protocol. The principles of the present invention, however, may similarly be applied, mutatis mutandis, in accelerating other sorts of record-based protocols that run over a reliable transport protocol, such as the Internet Small Computer Systems Interface (iSCSI). Furthermore, although the description below relates mainly to storage-related operations, the principles of the present invention may similarly be applied in other sorts of computations, such as data encryption and decryption, compression and decompression, and pattern matching.

System Description

Figure 1:
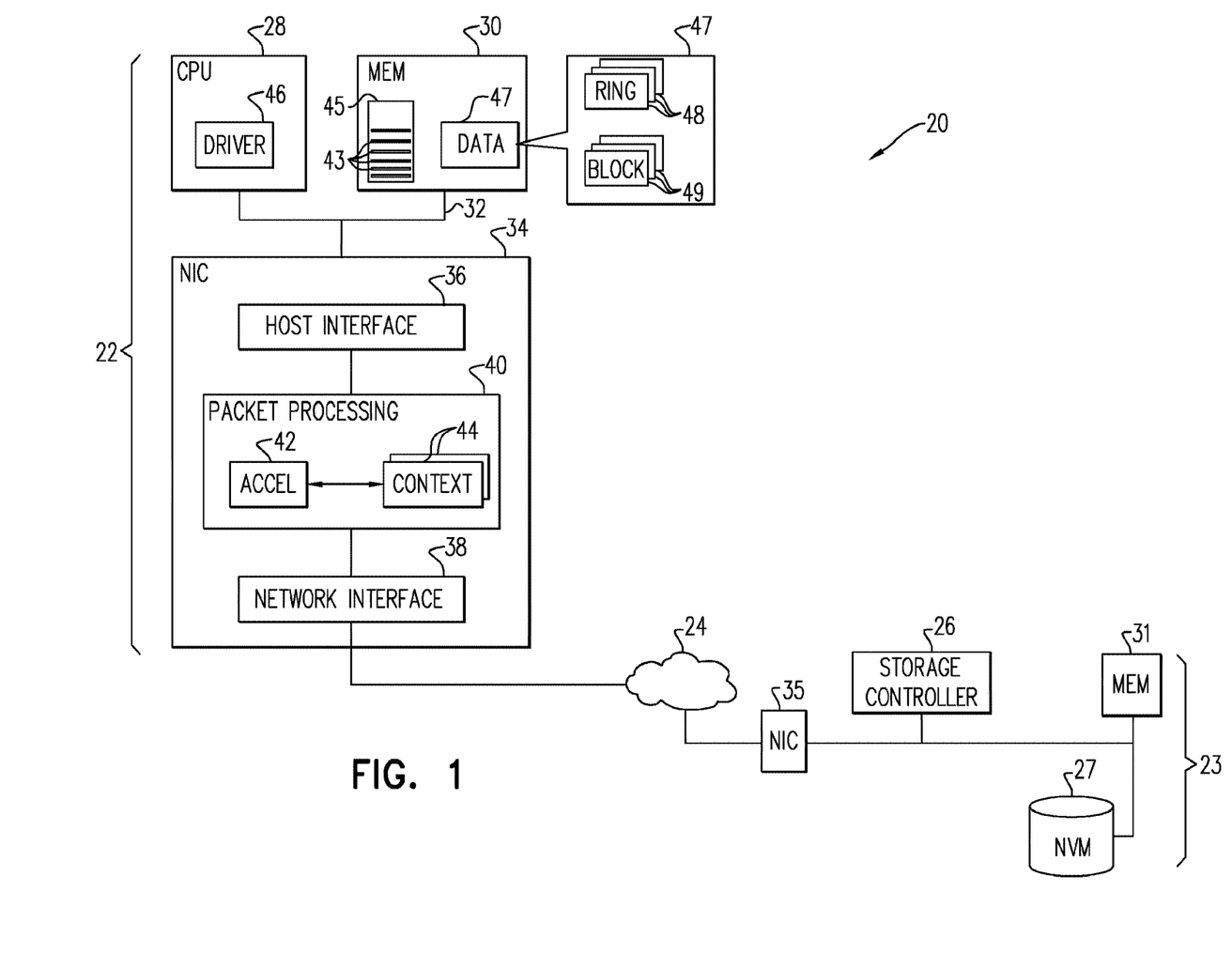
FIG. 1 is block diagram that schematically illustrates a computer system with a computational accelerator, in accordance with an embodiment of the invention.

FIG. 1 is block diagram that schematically illustrates a computer system 20 with a computational accelerator 42, in accordance with an embodiment of the invention. System 20 comprises a host computer 22, which is connected to communicate over a packet data network 24 with other computers, such as a storage host 23. Computer 22 comprises a CPU 28 with a host memory 30, typically comprising random-access memory (RAM), which are connected to a NIC 34 by a suitable bus 32, such as a PCIe bus. Similarly storage host 23 comprises a storage controller 26, such as a CPU running appropriate software, along with memory 31 and NVM 27, and is connected to network 24 by a NIC 35, which is similar in construction and functionality to NIC 34. In the present example, network 24 is assumed to be an Ethernet network, operating in accordance with the IEEE 802.3 family of standards, although the principles of the present invention are similarly applicable, mutatis mutandis, to networks of other types.

NIC 34 comprises a network interface 38 in the form of one or more physical network ports configured for connection to network 24. NIC 34 is connected to bus 32 through a host interface 36, comprising a suitable PCIe interface, for example. Processing circuitry 40 in NIC 34 is connected between network interface 28 and host interface 36 and handles both incoming packets received from network 24 and outgoing packets for transmission to network 24, while writing data to and reading data from buffers 47 in memory 30, as described in greater detail herein below.

In the pictured embodiment, accelerator 42 is implemented as a part of packet processing circuitry 40 and handles encoding and parsing functions in accordance with the NVMe/TCP protocol, in response to instructions conveyed by driver software 46 running on CPU 28. For this purpose, accelerator 42 maintains context data 44 in a memory for each TCP flow that it has been instructed to handle. Context data 44 may be held in a memory within NIC 34 and/or on a separate, dedicated memory chip and/or in a partition of host memory 30 that is assigned for this purpose.

Context data 44 for each such flow include:
- The TCP packet context, including the 5-tuple of fields in the IP packet header (IP source and destination addresses, IP source and destination ports, and the protocol) and the next expected TCP packet serial number (PSN).
- The NVMe context of each storage transaction that is in progress. Read and write operations in NVMe enclose request and response messages (including data written to or read from storage) in PDUs, whose header contains metadata including a PDU type, data offset, data length, and capsule identifier (CID) of the command that initiated the operation. The CID field is used to correlate between requests and responses, since multiple storage transactions, each having a different, respective context, can be conveyed over the same TCP connection, and the storage controller can service requests in any order. Thus, context data 44 may include multiple CIDs, each with its own, associated transaction context for any given connection.

For NVMe read requests, such as when host computer 22 asks to retrieve data stored by storage host 23, the context for each OD points to the buffer in host memory 30 to which the corresponding read response data from the storage host are to be written.

For NVMe write requests, such as when host computer 22 sends data for storage on storage host 23, the storage target (in this example storage host 23) allocates one or more buffers in memory 31 to receive the data and returns to the initiator one or more transport tags (TTAGs) corresponding to these buffers when the target is ready to receive the data. There may thus be multiple TTAGs per CID, and the initiator inserts the appropriate TTAG, along with the CID, in the write data PDUs that it then sends to the storage target. In this case, the context for each TTAG, together with the corresponding CID, points to the buffer in memory 31 in which NIC 35 is to place the NVMe data that it receives.

CRC offload context for each PDU containing data. Because PDUs may extend over multiple packets, accelerator computes a partial CRC over the part of the data in each TCP/IP packet that is transmitted or received (as long as the packets are received in order) and saves the partial result in context data 44 until the PDU has been completed.

These NVMe context values are initially downloaded to NIC 34 by software 46 for each new NVMe transaction that the NIC is to handle. The values are then updated by accelerator 42 each time a new packet in the flow is transmitted or received. Only a subset of the values is actually updated, however, such as the TCP PSN and partial CRC value for each packet, and the OD of each new record.

For the sake of clarity, the physical components of NIC 34 are shown in FIG. 1 as multiple, separate functional blocks. In practice, however, these components are typically (although not necessarily) implemented as hardware and firmware components within a single integrated circuit chip or chipset, possibly together with CPU 28, as well. Processing circuitry 40 typically comprises hardware logic circuits, which may be programmable or hard-wired and are configured to carry out the functions described herein, as well as other packet processing functions that are known in the art. Additionally or alternatively, at least some of these functions can be carried out by an embedded processor in NIC 34 under that control of software or firmware.

Accelerator 42 typically comprises control logic, which is responsible for packet handling and data transfer within the accelerator, and an arithmetic logic unit, which performs computational operations on payloads of outgoing and incoming packets that are received through interfaces 36 and 38. In the present embodiment, these operations include CRC computation and parsing of incoming messages, as well as recovery of context data 44 in case of retransmission or packet loss. Details of these operations for the case of NVMe are presented herein below. Circuitry that can be used in implementing such steps is known in the art and is beyond the scope of the present description.

To transmit NVMe messages to network 24, communication software, such as a NVMe/TCP protocol stack, running on CPU 28 writes descriptors 43 to a queue 45. The descriptors (also referred to as work requests or work queue elements, for example) specify the contents of the NVMe messages, including the locations of buffers 49 in memory 30 holding block data to be transmitted in NVMe write transactions and to receive block data from the network in NVMe read transactions. Although the large majority of the packets will be transmitted with their TCP serial numbers in order, CPU 28 will occasionally post a descriptor 43 calling for retransmission of a previous packet, for example, when storage controller 26 has failed to acknowledge the packet. In this case, the descriptor may contain additional information to assist accelerator 42 in recovering context data 44 that will be needed for encoding of the transmitted packets, as explained in greater detail herein below with reference to FIG. 3.

When NIC 34 receives NVMe/TCP packets from network 24, accelerator 42 applies appropriate context data 44 in parsing the packet payloads. When the packet payloads contain data, as in NVMe read responses, processing circuitry 40 then writes the payload data to a specified buffer 49 that is indicated by context data 44. Processing circuitry 40 writes the TCP and NVMe headers of the packets to a TCP ring buffer 48 (but may skip over writing the NVMe data to the ring buffer as long as the packets were received in order and the data written to buffer 49). These direct data placement functions of NIC 34 are described further herein below with reference to FIG. 5.

As in the case of packet transmission, packets are generally received from network 24 in serial order within their respective flows (for example, flows of TCP packets), so that accelerator 42 is able to maintain valid context data 44 from one packet to the next. When a packet in a given flow is received out of order, accelerator 42 searches the payloads of the packets in the given flow (typically beginning with the out-of-order packet) in order to find NVMe record headers (i.e., the PDU headers), and then reconstructs context data 44 using these headers. These search and reconstruction functions are described further herein below with reference to FIG. 6.

Once context data 44 have been recovered, accelerator 42 can resume parsing of the received data packets and direct placement of the NVMe data in buffers 49. In the meanwhile, until the recovery has been completed, processing circuitry 40 will typically signal CPU 28 that parsing has been suspended, and will write the data packets received in the flow in question, starting from the out-of-order packet, to ring buffer 48 in host memory 30 without performing the NVMe processing steps of checking the CRC and directly placing the NVMe data in buffers 49. CPU 28 will then parse the NVMe data records in software. Although this approach imposes a transient computational burden on the CPU, it avoids the memory and communication burdens of buffering and replaying these packets through the accelerator.

Although FIG. 1 shows one possible implementation of accelerator 42, other implementations will be apparent to those skilled in the art after reading the present description and are considered to be within the scope of the present invention. For example, some functions of accelerator 42, such as CRC computations, may be implemented in a bump-in-the-wire configuration, as described in the above-mentioned US 2016/0330112, rather than as a part of the NIC.

Processing of Transmitted Packets

Figure 2:
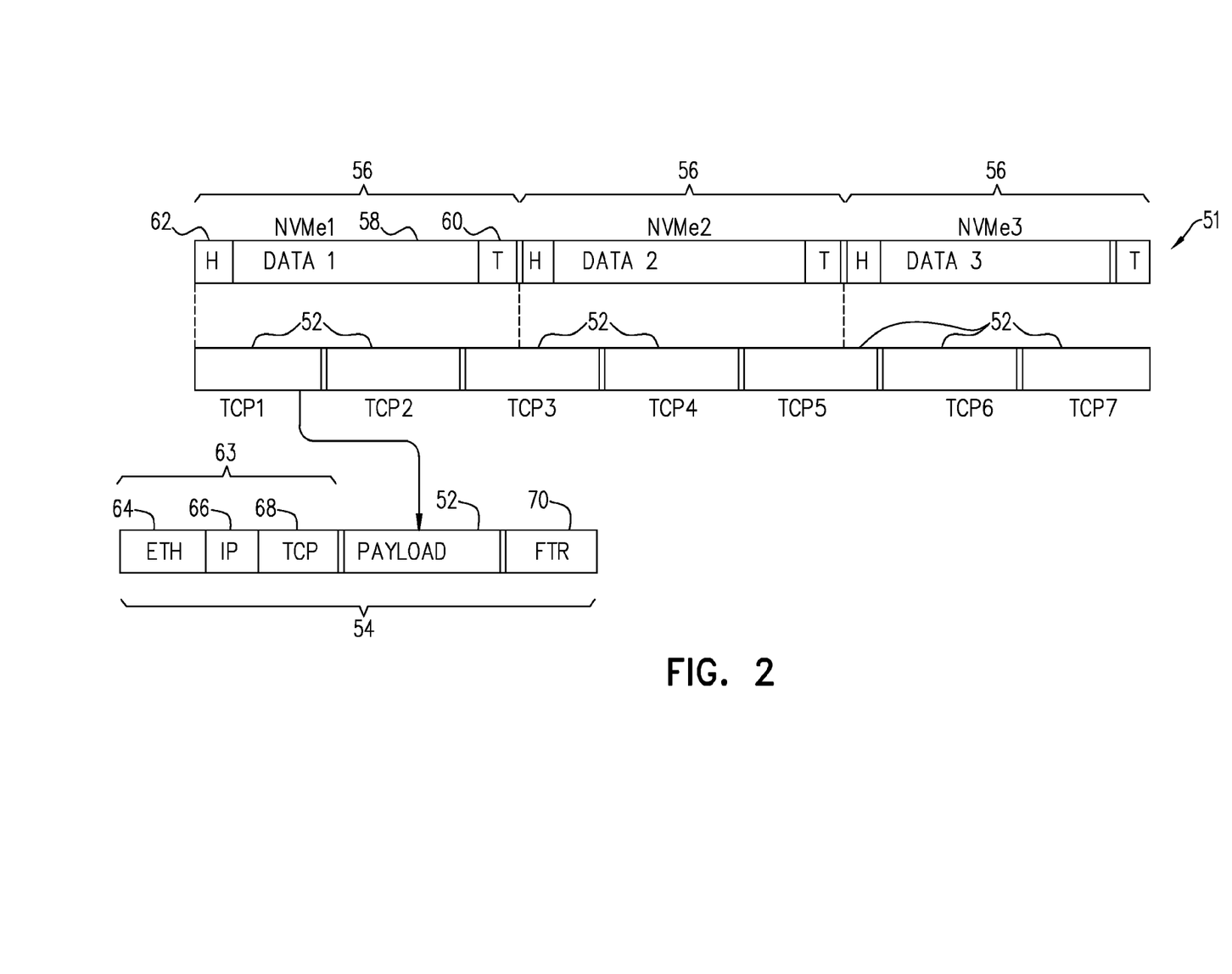
FIG. 2 is a block diagram that schematically illustrates framing of data processed by a computational accelerator in a sequence of packets, in accordance with an embodiment of the invention.

FIG. 2 is a block diagram that schematically illustrates framing of a stream of data 51 processed by accelerator 42 and transmitted by NIC 34 in a sequence of packets 54, in accordance with an embodiment of the invention. Data 51 in this example are encoded in a sequence of records, referred to as PDUs 56, complying with the NVMe protocol and record format, in accordance with the applicable specifications. Following these operations, NVME PDUs 56 are transmitted in payloads 52 of a sequence of TCP packets 54.

Software running on CPU 28 divides the stream of data 51, which is initially held in memory 30, into a sequence of blocks 58 of a given length, which can be larger than the maximum length of packets 54, and respective PDUs 56 containing the blocks. Each such PDU 56 comprises an NVME header 62, which identifies the transaction type and other parameters, and a digest 60, which is to contain a CRC error detection code that is computed over the data in block 58. Rather than computing the CRC itself, however, the software writes a dummy value to digest 60 and leaves the task of actually computing the CRC to accelerator 42.

The software also defines packets 54, including the length of payloads 52 and some or all of the fields in packet headers 63. Driver software 46 writes descriptors 43 to queue 45, specifying the addresses and lengths of data blocks 58 that processing circuitry 40 is to read from memory 30, as well as packet parameters, such as the TCP payload size and packet serial numbers. Because the size of blocks 58 is greater than the size of payloads 52, the lengths of data PDUs 56 span multiple consecutive packets 54. Thus, for example, the data PDU marked NVMe2 spans the payloads of TCP packets TCP3, TCP4 and TCP5.

Upon receiving descriptors 43 for transmitting packets 54, processing circuitry 40 reads corresponding PDU data blocks 58 from memory 30. Accelerator 42 computes the actual CRC value over the data and inserts the computed value in digest 60. Because each PDU 56 may extend over multiple packets 54, accelerator 42 may use context data 44 to store partial CRC results as it computes the NVMe digest over multiple packets, before writing the final value to the packet containing the digest.

These encoded NVMe PDUs 56 are broken up among TCP payloads 52 of successive packets 54 for transmission to network 24. In accordance with TCP/IP standards, header 63 of each packet comprises Ethernet and IP headers 64 and 66, followed by a TCP header 68, containing the packet serial number (PSN) The updated PSN value is held in context data 44 to verify that the correct acceleration state is used in encoding each successive block 58 of data. Processing circuitry 40 also adds a footer 70 to each packet in accordance with the applicable standards.

In some embodiments, accelerator 42 performs other computations, such as encoding and decoding of the data in accordance with the TLS protocol. In this case, following NVMe encoding of data 51 into PDUs 56, accelerator 42 will partition the sequence of PDUs into TLS records, and will then encrypt the TLS records in accordance with instructions from CPU 28 and relevant context data. Payloads 52 will thus contain the NVMe data in encrypted form. Further details of this encryption process are described in the above-mentioned U.S. patent application Ser. No. 16/159, 767.

Figure 3:
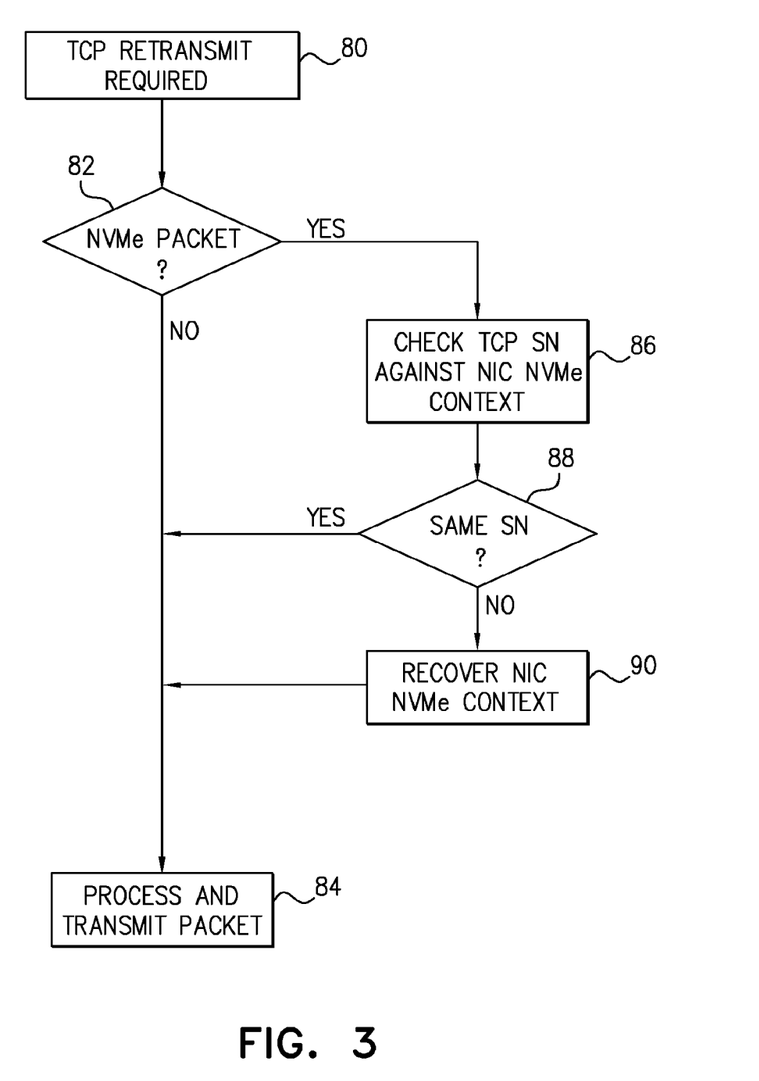
FIG. 3 is a flow chart that schematically illustrates a method for processing of a packet for retransmission to a network by a computational accelerator, in accordance with an embodiment of the invention.

FIG. 3 is a flow chart that schematically illustrates a method for processing of a packet for retransmission to network 24 by accelerator 42, in accordance with an embodiment of the invention. The method is initiated, for example, when the TCP protocol stack running on CPU 28 determines that a certain packet should be retransmitted (for example because it was not acknowledged by the destination computer), at a retransmission requirement step 80.

In this case, driver software 46 posts a descriptor 43 in queue 45, identifying the packet that is to be retransmitted. In many cases, the PSN of this retransmitted packet will be out of order, i.e., it will not follow sequentially after the PSN of the preceding packet transmitted on this socket and may therefore require the appropriate context to be recovered, rather than simply using the context currently held by accelerator 42. This context recovery can be performed by driver software 46 as part of the preparation of descriptor; or it may alternatively be carried out by accelerator 42. In the former case, when the driver software detects that the PSN is not the next expected value in the sequence, the descriptor that it prepares may contain the metadata and pointers that accelerator 42 will need in order to recover the context to be used in encoding the retransmitted packet. Alternatively, the driver software may leave the task of checking the PSN to accelerator 42.

When descriptor 43 reaches the head of queue 45, processing circuitry 40 reads the descriptor and determines whether NVMe processing operations are to be applied to the corresponding packet, at an NVMe evaluation step 82. If not, the processing circuitry simply reads the packet data from memory 30, assembles it together with the packet header, and transmits the packet to network 24, at a packet transmission step 84.

On the other hand, if descriptor 43 calls for NVMe processing, the descriptor is passed at step 82 to accelerator 42 for handling. In one embodiment, as noted above, the descriptor prepared by driver software 46 will indicate to accelerator whether this packet is to be processed using the existing context, or whether context recovery will be required. Alternatively, when the PSN checking is not carried out by the driver software, accelerator 42 checks the corresponding context data 44 to find the next PSN that is expected to be transmitted in the TCP/IP flow in question, at a serial number checking step 86. The accelerator compares this context value to the PSN specified in descriptor 43, at a serial number comparison step 88. As long as the serial numbers match, accelerator 42 can simply process and encode the data for transmission using the existing context data 44, at step 84.

As noted earlier, however, the retransmission instructions at step 80 may reach processing circuitry 40 after accelerator 42 has already processed and transmitted one or more subsequent packets in the flow. In this case, the PSN in context data 44 will not match that specified in descriptor 43. Therefore, accelerator 42 recovers the applicable context in order to encode payload 52 of the required packet, at a context recovery step 90. Referring, for example, to the sequence of packets shown in FIG. 2, NIC 34 may receive an instruction to retransmit packet TCP5 after having most recently transmitted packet TCP7. In this case, accelerator 42 will have to recover and use the context of PDU NVMe2, rather than the current record NVMe3, in recomputing the CRC value that is to be inserted in digest 60. Once the context has been recovered, accelerator 42 can encode and transmit the packet to network 24 at step 84.

When accelerator 42 is itself responsible for reconstructing the NVMe context, accelerator 42 has to refer back to the preceding part of PDU NVMe2, which was contained in packets TCP3 and TCP4 in order to recover the state of context data 44 that should be used in encoding payload 52 of packet TCP5. These preceding packets do not have to be retransmitted, but accelerator 42 must still recover the contents of data block 58 that they contained in order to reconstruct the encoding state. For this purpose, accelerator 42 may query driver software 46 to provide pointers to record data transmitted in preceding packets in the flow (TCP3 and TCP4 in the present example). Alternatively, driver software 46 may insert metadata in descriptor 43 that refers to the relevant portion of data block 58. For these purposes, for example, the driver software may track the PSN, as well, or may provide the required metadata in every descriptor. Accelerator 42 will then be able to access, read and process the necessary data in order to recover the context at step 90.

Alternatively, when driver software 46 is responsible for reconstructing the NVMe context, the driver software may compute and pass relevant parts of the context state to accelerator 42 directly, so that the accelerator will not have to read and process the data. For this purpose, for example, driver software 46 may place a special descriptor containing the context metadata in queue 45, prior to the descriptor instructing NIC 34 to reconstruct the packet.

After having recovered the NVMe context at step 90 and completed the required retransmission of packets, NIC 34 will often resume the orderly transmission of packets from the point at which it left off at step 80 (assuming the TCP version supports selective retransmission). Thus, referring again to FIG. 2, after having retransmitted packet TCP5, the NIC will next transmit packet TCP8. Resumption of transmission at packet TCP8, however, requires that context data 44 be restored to the state of the context following transmission of packet TCP7.

In an embodiment of the present invention, to avoid having to reconstruct the context twice (once for packet TCP5 and then again for packet TCP8), accelerator 42 saves the context as it stood following the last packet transmitted in order (TCP7 in the present example) before beginning recovery of the earlier context at step 90. After the out-of-order packet has been retransmitted, accelerator 42 resumes encoding of data records 56 (beginning from packet TCP8) using the saved context. In other words, accelerator 42 may save at least two sets of context data 44 for each flow: one at the tip of the TCP window, meaning the last packet that was transmitted in order, and another context that is reconstructed for purposes of retransmission.

Processing of Received Packets

Figure 4:
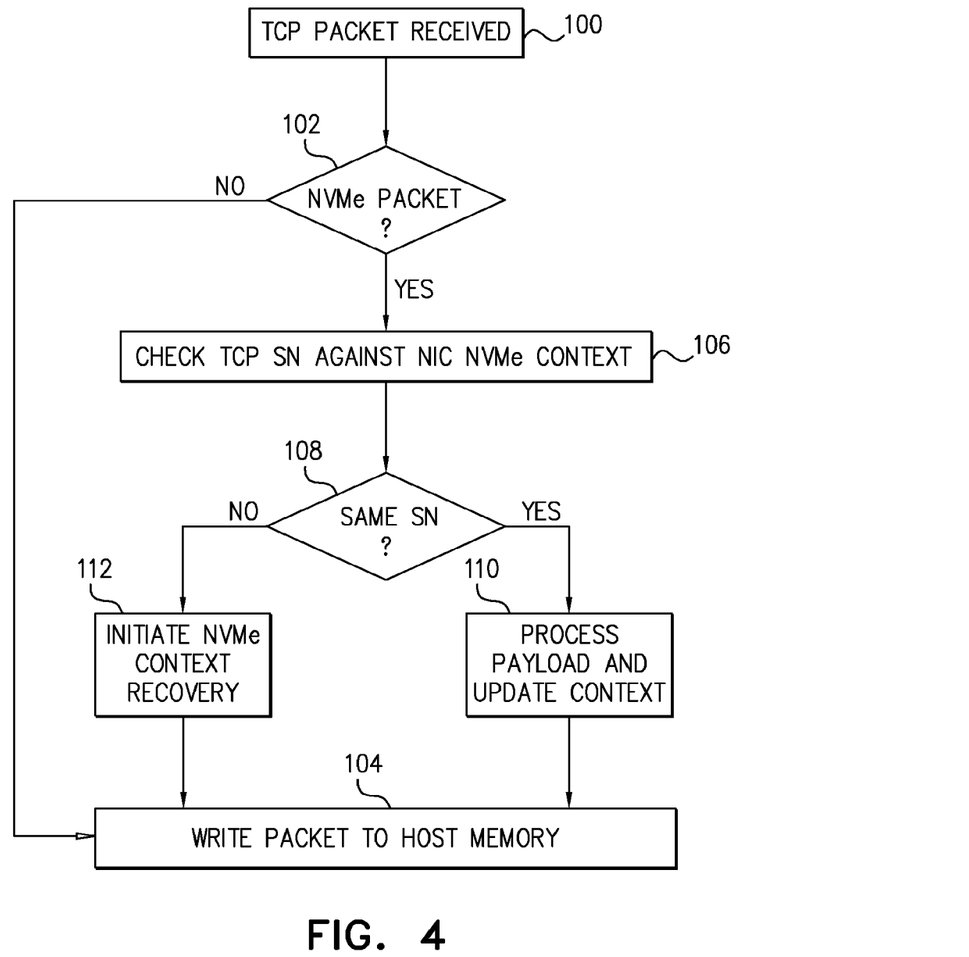
FIG. 4 is a flow chart that schematically illustrates a method for processing of a packet received from a network by a computational accelerator, in accordance with an embodiment of the invention.
Figure 5:
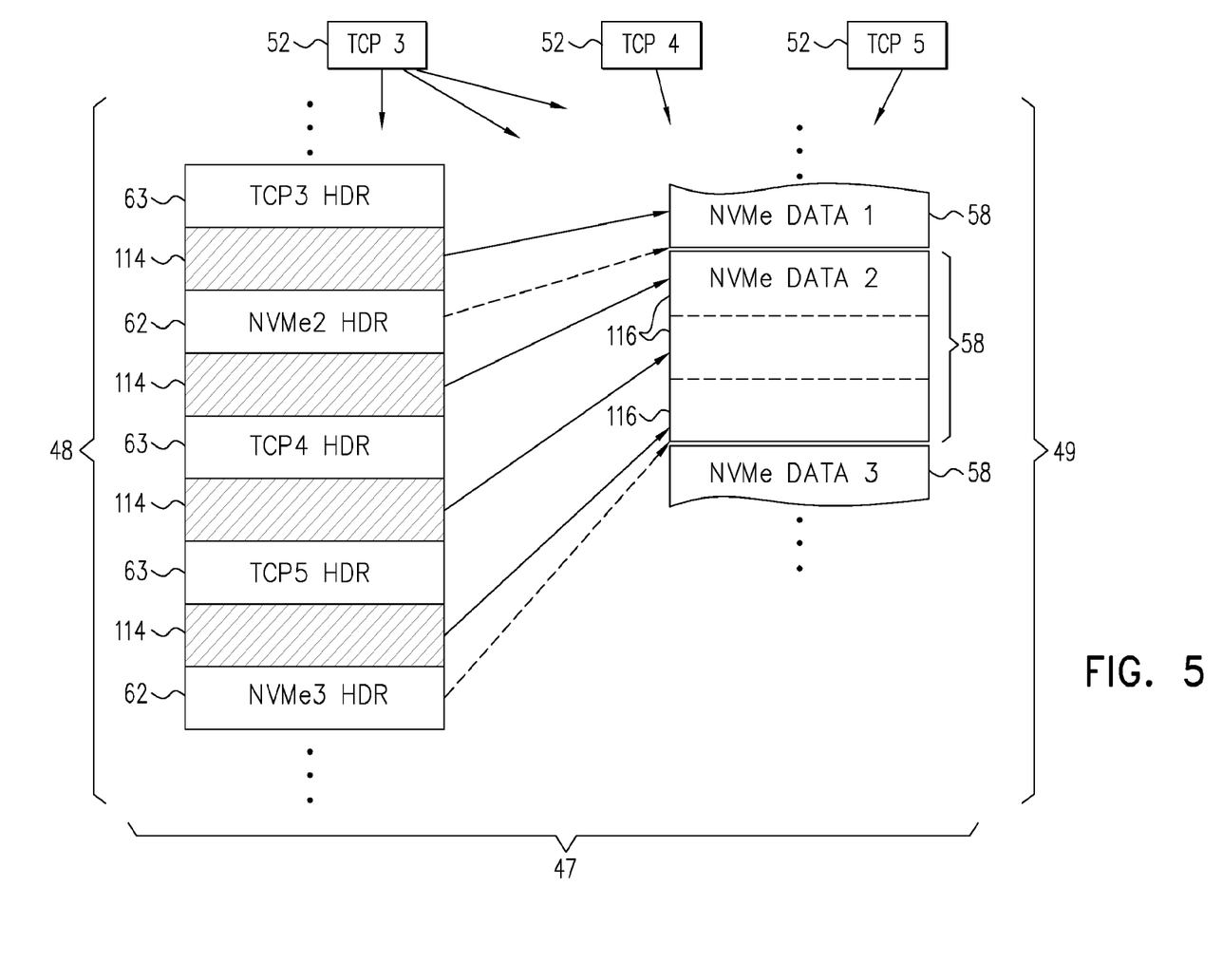
FIG. 5 is a block diagram that schematically illustrates direct data placement by a computational accelerator of packet data received from a network, in accordance with an embodiment of the invention.

Reference is now made to FIG. 4 and FIG. 5, which schematically illustrate a method for processing of packets received from network 24 by accelerator 42, in accordance with an embodiment of the invention. FIG. 4 is a flow chart showing steps in the method, while FIG. 5 is a block diagram illustrating direct data placement by processing circuitry 40 of packet data received from the network into buffers 48 and 49 in memory 30 (FIG. 1).

The method in this case is initiated each time processing circuitry 40 in NIC 34 receives a TCP packet from network 24 through network interface 38, at a packet reception step 100. Processing circuitry 40 checks the packet to determine whether payload 52 contains NVMe data, at a protocol checking step 102. (In embodiments in which accelerator 42 also handles cryptographic operations, such as TLS protocol operations, processing circuitry 40 will first check whether the data in the packet are encrypted in accordance with the applicable protocol, and will decrypt payload 52 before it performs NVMe parsing and other data placement steps. Further details of this decryption process are described in the above-mentioned U.S. patent application Ser. No. 16/159, 767.) If payload 52 does not contain NVMe data, processing circuitry 40 writes the packet via host interface 36 to the appropriate ring buffer 48 in memory 30, at a data writing step 104, without invoking accelerator 42. Processing circuitry 40 typically carries out other packet processing functions, as well, but they are beyond the scope of the present description.

When an NVMe packet is identified at step 102, accelerator 42 reads the TCP PSN from header 68 and reads the expected PSN value for this flow from the applicable context data 44, at a serial number checking step 106. Accelerator compares these PSN values at a serial number matching step 108. If the PSN of the received packet matches the expected value, accelerator parses packet payload 52 and updates the appropriate values in context data 44, at a payload processing step 110. Processing circuitry 40 then writes the packet to memory 30 at step 104. As long as the bit error rates and congestion level in network 24 are within reasonable bounds, the large majority of incoming NVMe packets will be handled in this manner.

As noted earlier with reference to FIGS. 1 and 2, the record headers in payloads 52, i.e., NVMe PDU headers 62, specify respective NVMe block buffers 49 in memory 30. When NIC 34 transmits an NVMe read request PDU with a certain CID to storage controller 26, context data 44 for this CID are updated to indicate the address of this buffer. When NIC 34 receives TCP packets 54 containing the NVMe read response, accelerator 42 can then parse NVMe headers 62 to ascertain the CID, and then looks up the appropriate context data 44 in order to identify the respective buffers 49. (As noted earlier, a given TCP connection between computer 22 and storage controller 26 can be used for multiple concurrent NVMe transactions; and therefore, the TCP context by itself does not provide sufficient information to enable direct placement of NVMe data into buffers 49.) By the same token, when storage host 23 provides a TTAG in response to an NVMe write request by NIC 34, an accelerator in NIC 35 can parse the NVMe headers in the TCP/NVMe write data packets to extract the CID and TTAG, and use its own CID/TTAG context data in order to identify the buffers in memory 31 in which it should place the data. Processing circuitry 40 writes NVMe data block 58 to the identified buffers 59, as shown in FIG. 5. When the NVMe read response PDU 56 is spread over payloads 52 of multiple successive TCP packets 54, processing circuitry 40 extracts respective segments 116 of the data contained in block 58 from payload 52 of each packet and writes it to the appropriate location in buffer 49, using context data 44 to identify the start address for each segment 116 in the buffer.

In addition to writing NVMe data block 58 to buffer 49, processing circuitry 40 writes TCP packet headers 63 and NVMe PDU headers 62 directly to the appropriate receive ring buffer 48 in memory 30. This buffer is separate from the buffers identified by the record headers. Assuming processing circuitry has successfully written the NVMe data in payload 52 to NVMe buffer 49, there is no need to write the data to TCP ring buffer 48. Payload slots 114 in ring buffer 48 may therefore contain null data or pointers to the corresponding segments 116 in buffer 49.

As accelerator 42 receives successive packet payloads 52 containing segments 116 of a given NVMe block 58, and computes a CRC value cumulatively over the segments until it reaches the end of the block. At this point, processing circuitry 40 compares the computed CRC value to the value in digest 60 of the corresponding PDU 56 and thus verifies that no errors have occurred in the block. As long as the CRC values match, processing circuitry 40 reports to driver software 46 that the NVMe transaction has been completed successfully and that data block 48 is now available in buffer 49. No further verification of the CRC is required by CPU 28. For example, processing circuitry 40 may write a descriptor to the processing queue of the driver software, with a flag set to indicate the CRC verification status. When the status is negative, NVMe/TCP software running on CPU 28 may request that storage controller 26 retransmit the block in question.

Returning now to FIG. 4, when there is a mismatch of PSN values at step 108, accelerator 42 concludes that the packet has been received out of order. In this case, the accelerator initiates the process of reconstructing context data 44, at a context recovery step 112. The context is reconstructed by reading and searching through the header and payload fields of the current packet (containing the serial number that is out of order) and, in some cases, subsequent packets in this flow in order to extract the information required for context reconstruction. Specifically, accelerator 42 attempts to find at least one NVMe PDU header, and reconstructs context data 44 using the information in the PDU header. This process of search and reconstruction is described further herein below.

Once context data 44 have been reconstructed, accelerator 42 will be able to apply the context data in processing subsequent NVMe/TCP packets in this flow. In the meanwhile, processing circuitry 40 may write this packet and subsequent packets in the same flow to the appropriate ring buffer 48 memory 30 for parsing by CPU 28. For example, when NIC 34 fails to receive a certain packet 54 in a given flow, accelerator 42 may skip parsing of all subsequent packets until it has reached a packet that contains header 62 of the next NVMe PDU 56. Thus, referring to FIG. 2, if packet TCP3 is lost, accelerator 42 will pass packets TCP4 and TCP5 to memory 30 without parsing. If the accelerator then succeeds in identifying and reading header 62 of record NVMe3 in packet TCP5, it can reconstruct and apply the context in processing the payloads of packets TCP6 and TCP7.

Accelerator 42 may be able to find the location of the next header in the packet series on the basis of the NVMe length field that it read from header 62 of the previous NVMe PDU 56. The accelerator can then skip over payloads 52 of packets 54 until it has reached the expected header location. Accelerator 42 thus applies the value of the length field in finding and verifying the next PDU in a subsequent packet in the sequence.

In some cases, as noted earlier, NVMe PDUs 56 have respective lengths that span multiple consecutive data packets 54, and accelerator 42 may then search for the next record header 62 over a sequence of two or more packets in the flow. When accelerator 42 skips over packets to find the next record header, it may save two sets of context data 44 for the flow in question: one for the current NVMe record, in which a packet was missed, and the other for the next record. When the out-of-order packet or packets are subsequently received by NIC 34 from network 24, accelerator 42 can apply the saved context data in parsing the packets.

Figure 6:
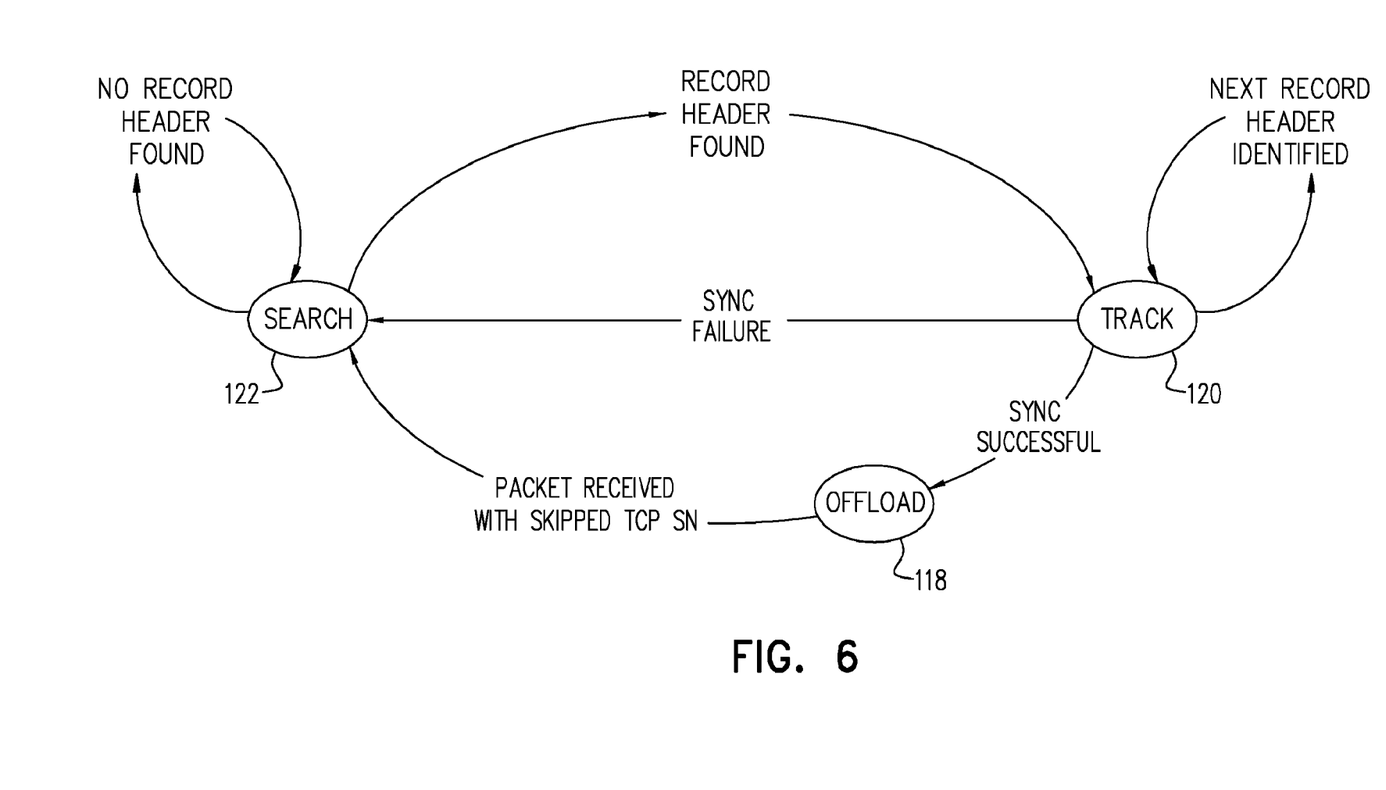
FIG. 6 is a state diagram that schematically illustrates a state machines maintained by a computational accelerator for processing of packets received from a network, in accordance with an embodiment of the invention.

FIG. 6 is a state diagram that schematically illustrates a state machine maintained by accelerator 42 for processing of packets received from network 24, in accordance with an embodiment of the invention. The state machine ensures that the operation of accelerator 42 is properly synchronized with the TCP packet flow and NVMe PDU flow, as long as packets are received in order, and enables recovery of synchronization and reconstruction of context data 44 when a packet is received out of order.

Operation of accelerator 42 on a given TCP flow begins in an offload state, after driver software 46 has initialized the context for an NVMe/TCP transaction. The accelerator remains in this state as long as successive TCP headers are received in order. When a packet is received with an out-of-order TCP sequence number (as at step 108 in FIG. 4), however, accelerator 42 enters a search state 122, where it remains until a new NVMe header is found. (Alternatively, the state machine may be configured so that even when a packet is received with its TCP sequence number out of order, the accelerator may remain in the offload state as long as the PDU headers in the packet payloads are received in order.) In this state, accelerator 42 passes packets to the appropriate ring buffer 48 in memory 30 without parsing, while waiting for the results of resynchronization.

In some cases in search state 122, the next NVMe header 62 can be found using the length field, as explained above. Alternatively, when the record length is unavailable, accelerator 42 can search over packets 54 until it finds one or more known data values that are expected to appear in the NVMe headers. For example, NVMe headers 62 contain a one-byte PDU type, which can have only one of eight values; and the PDU type is following by a one-byte header length, which has a specified constant value for each PDU type. Thus, in search state 122, accelerator 42 can search for legal pairs of the PDU type and header length values. Additionally or alternatively, may search for and use the (optional) four-byte CRC header digest and/or the CRC value in PDU digest 60 in finding and verifying the header pattern.

Upon finding a bit pattern that is characteristic of an NVMe header, accelerator 42 enters a tracking state 120. In the tracking state, accelerator 42 checks the NVMe PDU length and verifies that the next NVMe header is at the expected location. Additionally or alternatively, accelerator 42 may extract the current NVMe CID and/or the TCP PSN and ask the host software to verify that the extract value or values are correct. If so, accelerator 42 is able to synchronize its operation with the host NVMe/TCP software, and thus enters offload state 118 and resumes parsing of incoming NVMe/TCP packets. Otherwise, the accelerator returns to search state 122.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. An apparatus comprising:
a first interface to couple to a host processor having a host memory;
a second interface to transmit and receive data packets to and from a packet communication network; and
processing circuitry coupled between the first interface and the second interface, the processing circuitry comprising an accelerator to:
detect a serial number of a first data packet is out of order with respect to a previous data packet within a first flow of data packets, wherein the serial number is assigned to the first data packet according to a transport protocol;

reconstruct context data associated with the first flow of data packets, wherein the context data comprises encoding information for encoding of data records containing data conveyed in payloads of data packets in the first flow of data packets according to a storage protocol; and use the reconstructed context data in processing a data record associated with a second data packet within the first flow, wherein the second data packet is subsequent to the first data packet in the first flow of data packets.

2. The apparatus of claim 1, wherein, to the use the reconstructed context data, the accelerator is further to:

encode, using the reconstructed context data, a data record associated with the first data packet; and write the data record to the host memory.

3. The apparatus of claim 2, wherein the reconstructed context data incudes cyclic redundancy check (CRC) information and the accelerator is further to use the CRC information to generate a digest value for the data record.

4. The apparatus of claim 1, wherein the processing circuitry is further to write the data packets received in the first flow, starting from the first data packet, to the host memory without extracting data from the data records until the accelerator has completed reconstructing the context data.

5. The apparatus of claim 1, wherein the data records comprise record headers, and wherein the accelerator is further to:

search payloads of one or more of the data packets in the first flow beginning with the first data packet to find at least one of the record headers; and reconstruct the context data using the at least one of the record headers.

6. The apparatus of claim 5, wherein at least some of the data records have respective lengths that span multiple consecutive data packets, the record headers contain a length field containing a value indicating a length of the data records, the accelerator further to:

search for the at least one of the record headers over a sequence of the data packets in the first flow;

identify a record header of a first record in one of the data packets in the sequence;

read a value of the length field from the identified record header; and apply the value of the length field in finding and verifying a second record in a subsequent packet in the sequence.

7. The apparatus of claim 1, wherein at least one of the transport protocol comprises Transmission Control Protocol (TCP) or the storage protocol comprises Non-Volatile Memory Express (NVMe) protocol.

8. The apparatus of claim 1, wherein the data records comprise record headers, which specify respective buffers in the host memory, the accelerator is further to:

parse the record headers to identify the respective buffers;

write data of the data records to the identified buffers; and write packet headers of the data packets and the record headers of the data records to a receive ring buffer in the host memory, the receive ring buffer being different from the respective buffers and associated with the first flow.

9. The apparatus of claim 1, wherein the accelerator is further to:

process the data records to compute and verify an error-detection code over each of the data records in accordance with the storage protocol; and upon verifying the error-detection code over a given data record, indicate to software running on the host processor that further verification of the error-detection code by the host processor is not needed.

10. The apparatus of claim 1, wherein the transport protocol defines a connection over the packet communication network with a peer computer, wherein the data records conveyed over the connection pertain to multiple storage transactions, each having a different, respective context, and wherein the accelerator is further to:

identify the respective context of each of the data records; and parse each of the data records using the identified context.

11. A method comprising:

detecting, by an accelerator of a networking device, a serial number of a first data packet is out of order with respect to a previous data packet within a first flow of data packets associated with a packet communication network, wherein the serial number is assigned to the first data packet according to a transport protocol;

reconstructing context data associated with the first flow of data packets, wherein the context data comprises encoding information for encoding of data records containing data conveyed in payloads of data packets in the first flow of data packets according to a storage protocol; and using, by the accelerator, the reconstructed context data in processing a data record associated with a second data packet within the first flow, wherein the second data packet is subsequent to the first data packet in the first flow of data packets.

12. The method of claim 11, further comprising:

encoding, using the reconstructed context data, a data record associated with the first data packet; and writing the data record to a host memory coupled with the networking device.

13. The method of claim 12, wherein the reconstructed context data incudes cyclic redundancy check (CRC) information, the method further comprising, using the CRC information to generate a digest value for the data record.

14. The method of claim 11, further comprising writing the data packets received in the first flow, starting from the first data packet, to a host memory without extracting data from the data records until the accelerator has completed reconstructing the context data.

15. The method of claim 11, wherein the data records comprise record headers, the method further comprising:

searching payloads of one or more of the data packets in the first flow beginning with the first data packet to find at least one of the record headers; and reconstructing the context data using the at least one of the record headers.

16. The method of claim 15, wherein at least some of the data records have respective lengths that span multiple consecutive data packets, the record headers contain a length field containing a value indicating a length of the data records, the method further comprising:

searching for the at least one of the record headers over a sequence of the data packets in the first flow;

identifying a record header of a first record in one of the data packets in the sequence;

reading a value of the length field from the identified record header; and applying the value of the length field in finding and verifying a second record in a subsequent packet in the sequence.

17. The method of claim 11, wherein at least one of the transport protocol comprises Transmission Control Protocol (TCP) or the storage protocol comprises Non-Volatile Memory Express (NVMe) protocol.

18. The method of claim 11, wherein the data records comprise record headers, which specify respective buffers in a host memory, the method further comprising:
parsing the record headers to identify the respective buffers; and
writing data of the data records to the identified buffers.

19. The method of claim 11, wherein the data records comprise record headers, which specify respective buffers in a host memory, the method further comprising:
parsing the record headers to identify the respective buffers;
writing data of the data records to the identified buffers; and
writing packet headers of the data packets and the record headers of the data records to a receive ring buffer in the host memory, the receive ring buffer being different from the respective buffers and associated with the first flow.

20. The method of claim 11, further comprising:
processing the data records to compute and verify an error-detection code over each of the data records in accordance with the storage protocol; and
upon verifying the error-detection code over a given data record, indicating to software running on a host processor that further verification of the error-detection code by the host processor is not needed.

21. The method of claim 11, wherein the transport protocol defines a connection over the packet communication network with a peer computer, wherein the data records conveyed over the connection pertain to multiple storage transactions, each having a different, respective context, and wherein the method further comprising:
identifying the respective context of each of the data records; and
parsing each of the data records using the identified context.

22. A computing system comprising:
a host processor;
a host memory coupled to the host processor; and
a network interface device coupled to the host processor, to the host memory, and adapted to be coupled to a network communication network, wherein the network interface device comprises an accelerator to:
detect a serial number of a first data packet is out of order with respect to a previous data packet within a first flow of data packets, wherein the serial number is assigned to the first data packet according to a transport protocol;
reconstruct context data associated with the first flow of data packets, wherein the context data comprises encoding information for encoding of data records containing data conveyed in payloads of data packets in the first flow of data packets according to a storage protocol; and
use the reconstructed context data in processing a data record associated with a second data packet within the first flow, wherein the second data packet is subsequent to the first data packet in the first flow of data packets.

* * * * *